No. 838,426. PATENTED DEC. 11, 1906.
L. KUCHENBECKER.
VEHICLE SEAT.
APPLICATION FILED APR. 4, 1906.
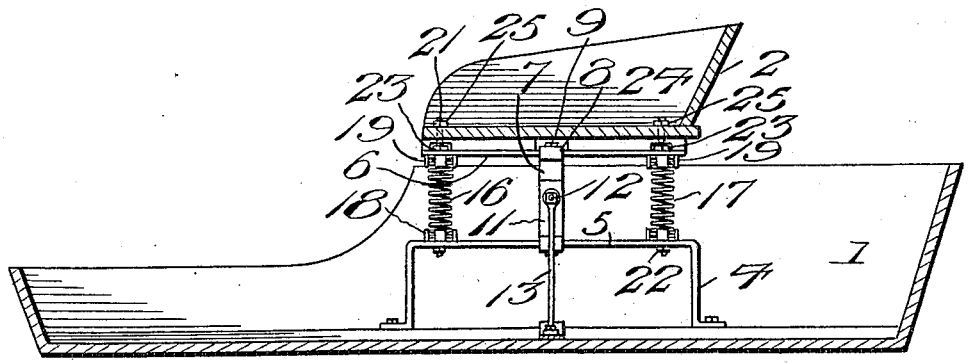
Fig. 1.
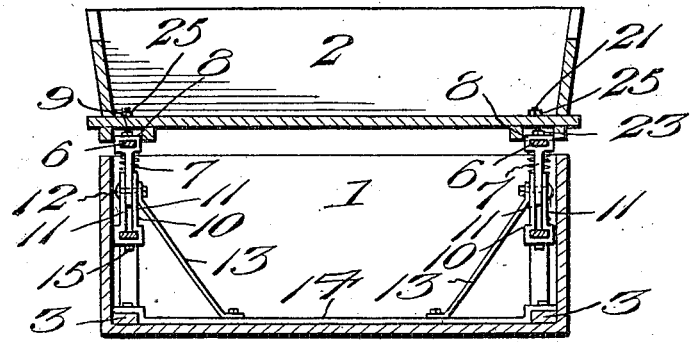
Fig. 2.
Fig. 3.
Inventor
Lewis Kuchenbecker,
By Victor J. Evans
Attorney
Witnesses

UNITED STATES PATENT OFFICE.

LEWIS KUCHENBECKER, OF WALTHAM, MINNESOTA, ASSIGNOR OF ONE-HALF TO HENRY BLUMER, OF WALTHAM, MINNESOTA.

VEHICLE-SEAT.

No. 838,426.   Specification of Letters Patent.   Patented Dec. 11, 1906.

Application filed April 4, 1906. Serial No. 309,776.

*To all whom it may concern:*

Be it known that I, LEWIS KUCHENBECKER, a citizen of the United States, residing at Waltham, in the county of Mower and State of Minnesota, have invented certain new and useful Improvements in Vehicle-Seats, of which the following is a specification.

The invention relates to an improvement in spring-supports for vehicle-seats designed primarily to prevent transmission of the usual vibration of the vehicle-body to the person occupying the seat.

The main object of the present invention is to provide a spring-support which in use provides for a cushioned independent rocking of the seat to avoid transmitting to the occupant the jars and vibrations incident to the ordinary movement of the vehicle, the construction providing for cushioning the movement of the seat in both directions.

The invention will be described in the following specification, reference being had particularly to the accompanying drawings, in which—

Figure 1 is a longitudinal central section through the vehicle-body, showing the seat thereof supported by my improved spring-support. Fig. 2 is a transverse section of the same. Fig. 3 is a perspective of one of the spring-cups.

Referring to the drawings, 1 represents a vehicle-body, and 2 the seat therefor, both of which parts, so far as the present invention is concerned, may be of any preferred construction.

Secured to the bottom strips 3 of the vehicle-body are inverted-U-shaped frame-bars 4, cross-bars 5 of which occupy a position longitudinally of the vehicle-body and some distance above the bottom thereof. Seat-strips 6 are secured to and beneath the side cleats of the seat, being respectively arranged when the seat is properly positioned in alinement with the cross-bars 5 of the respective frames 4. The seat-strips and frames 4 are pivotally connected through the medium of arms 7, formed at their upper ends with eyes 8 to snugly receive the strips 6, bolts or other fastenings 9 serving to fix the arms relative to said strips. A frame member 10 is formed to snugly embrace the cross-bar 5 of the frame and extended vertically therefrom to provide spaced parallel arms 11, between which is received the arms 7, a pivot-pin 12 forming the medium of connection and uniting the parts to permit independent rocking movement of the seat, as will be obvious. Brace-bars 13, secured at their upper ends upon the pivot-pins 12, extend at an angle toward the bottom of the vehicle-body and are secured to a cross-brace strap 14, which is terminally secured to the bottom strips 3. The bracket member 10 is secured in fixed relation to the cross-bar 5 through the medium of a fastening means 15, and said bracket members and arms 7 are preferably arranged centrally of the frame 4 and strips 6, whereby to provide for a uniform movement of the seat.

The seat is cushioned in its rocking movement through the medium of springs 16 and 17, arranged for coöperation with each strip 6 at frame 4, the former being arranged in advance of the pivotal connection and the latter in rear thereof. The ends of the springs are secured in contact with the strips 6 and cross-bars 5, respectively, through the medium of cups 18 and 19, the former securing the lower ends of the springs to the cross-bars 5, while the latter secures the upper ends thereof to the strips 6. The cups 18 and 19 are identical in construction except that the latter has a somewhat-longer shank for a purpose which will later appear. Each of the cups is provided with a peripheral flange 20, interrupted at determinate points to provide a series of flexible lips, designed to be slightly bent inward after the insertion of the adjacent coil of the spring therein to overlie said coil and retain the spring in place. A shank 21 projects from each cup, being designed in the case of the cups 18 to be passed through the cross-bars 5 of the frames 4 and be secured thereto through the medium of nuts 22, the cup proper, of course, resting upon the upper side of each cross-bar in position to receive the lower end of the spring. The stem 21 of the upper cups 19 is passed through the strips 6, with the cup resting against the lower side of said strips in position to receive the upper ends of the spring. Immediately above the strip the spring 21 is engaged by a nut 23, securing the cup to the strip, the remainder of the stem 21 passing through the side cleats of the seat and through the bottom board 24 of the seat, being secured therebeyond by a nut 25. The upper cups are thus secured to the strips and to the material of the seat, providing for a secure fastening for the cups. The springs are secured in place as described, it being understood, of course, that the respective cups for any one spring are arranged in alinement to normally maintain the spring in proper position for service.

The side cleats of the seat proper are preferably of a single strip of material, in which event, of course, the strip is to be suitably recessed or cut away to permit the use of the fastening means 9 and 22, as will be apparent from Fig. 1.

In use any vibration of the vehicle-body incident to the use of the vehicle will cause a rocking movement of the seat on its pivot-pin 12, which movement is cushioned in both directions by the springs 16 and 17. The use of the cups 18 and 19 provides for the ready insertion or renewal of the springs without material effort and further provides for the use of the ordinary coil-spring without particular formation to permit its connection in the desired relation. By the use of the brace-bars 13, arranged to directly support the pivots 12, any tendency to lateral movement of the parts is prevented, and I am thereby enabled to make these parts of lighter material than would be otherwise possible.

The device described provides a simple and practical construction in the use of which vibration or jar incident to the travel of the vehicle-body is compensated for and its transmission to the occupant of the seat is avoided, whereby provision is made for easy riding under practically all conditions of road-bed.

While preferring that the cups 18 and 19 be secured to the strips and cross-bars in a manner described, it is obvious that they may be without changing the material results of the invention welded to or cast with said frame-bars, and I contemplate such construction as within the spirit and scope of the present invention.

Having thus described the invention, what is claimed as new is—

1. The combination with a vehicle-body and a seat therefor, of a frame secured to the body, a frame member secured to the frame, an arm secured to and depending from the seat and pivotally connected to the frame member, cups secured to the frame and to the seat in front and in rear of said connection, and springs removably seated in the cups.

2. The combination with a vehicle-body and a seat therefor, of a frame secured to the body, a frame member secured to the frame, an arm secured to and depending from the seat and pivotally connected to the frame member, cups secured to the frame and to the seat in front and in rear of said connection, springs removably seated in the cups, and braces connecting said frame members and vehicle-body.

3. The combination with a vehicle-body and a seat therefor, of a frame secured to the body, bracket members secured to the frame, strips secured to the seat, arms secured to the strips and having pivotal connection with the frame members, cups secured to the strips in front and in rear of the arms, cups secured to the frame in front and in rear of the frame member, and springs seated in the respective alined cups.

4. The combination with a vehicle-body and a seat therefor, of a frame secured to the body, bracket members secured to the frame, strips secured to the seat, arms secured to the strips and having pivotal connection with the frame members, cups secured to the strips in front and in rear of the arms, cups secured to the frame in front and in rear of the frame member, and springs seated in the respective alined cups, each of said cups having an interrupted peripheral flange to provide flexible lips to engage the end coil of the spring.

In testimony whereof I affix my signature in presence of two witnesses.

LEWIS KUCHENBECKER.

Witnesses:
O. P. RASK,
A. A. MORSCHING.